May 29, 1962   A. AQUILLON ET AL   3,036,479

MACHINE-TOOL

Filed Dec. 26, 1957   4 Sheets-Sheet 1

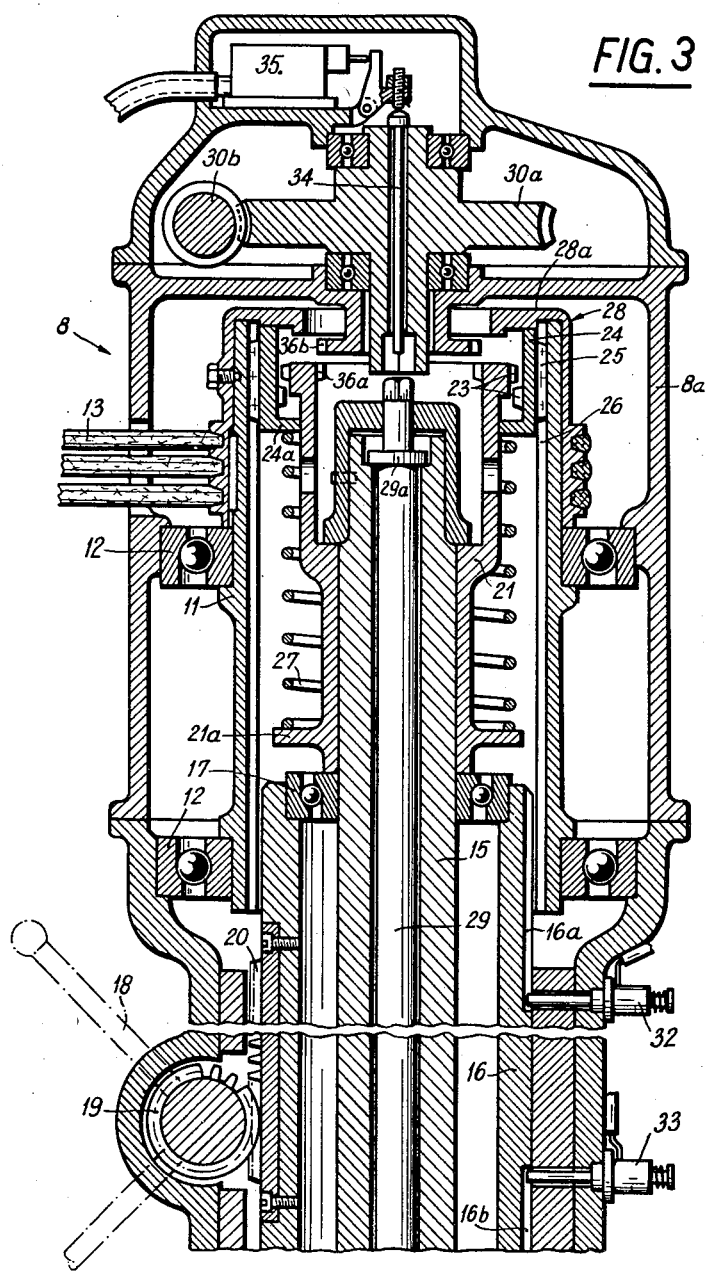

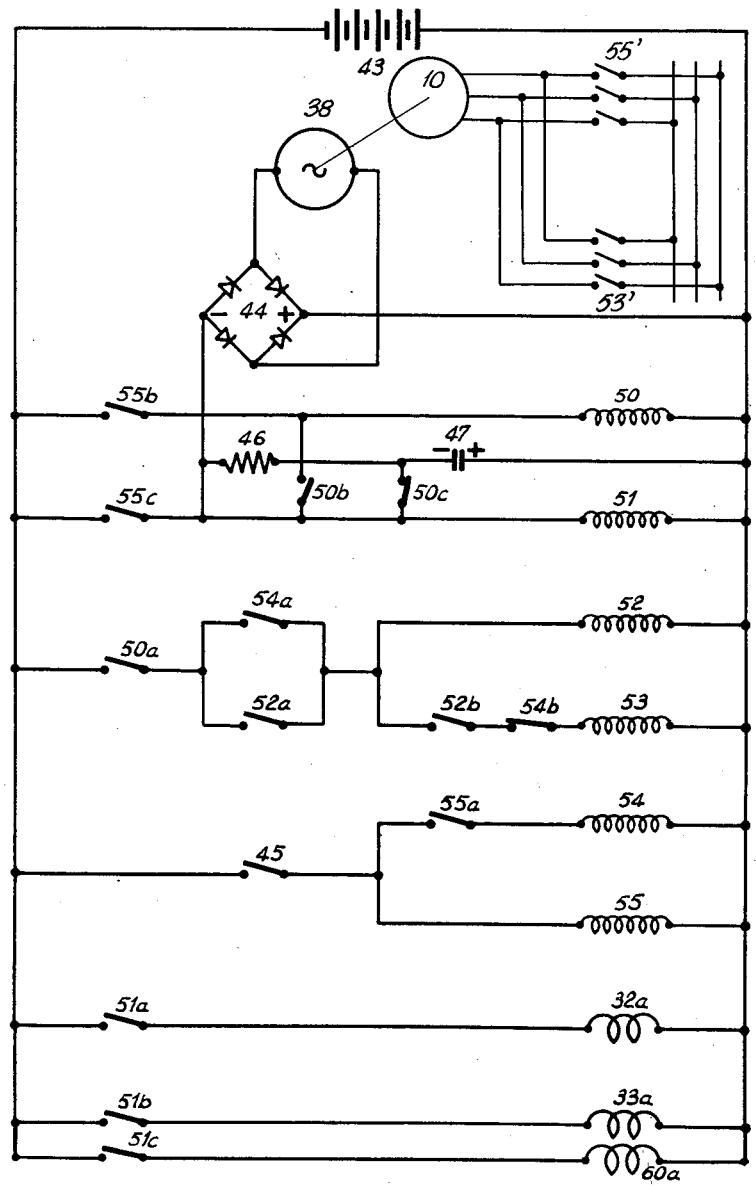

United States Patent Office 3,036,479
Patented May 29, 1962

3,036,479
MACHINE-TOOL
André Aquillon, Carouge, Geneva, and André Pingeon, Petit-Lancy, Geneva, Switzerland, assignors to Societe Genevoise d'Instruments de Physique, Geneva, Switzerland, a Swiss firm
Filed Dec. 26, 1957, Ser. No. 705,413
Claims priority, application Switzerland Sept. 13, 1957
7 Claims. (Cl. 77—4)

The present invention has for its object a machine-tool equipped with means for braking rotary members and at least one safety system.

According to the invention, automatic control means are provided for cutting out the operation of the braking means before the rotary member stops without making the safety system inoperative before said rotary member has actually stopped.

Accompanying drawings illustrate by way of example a preferred embodiment of a machine-tool according to the invention. This embodiment is a jig borer wherein a rotary member to be braked is a motor driving a tool-carrying spindle.

In order not to complicate the drawing to an unnecessary extent, only a section of the machine has been illustrated, namely, the parts sliding over the horizontal bed and including the headstock, the motor driving the spindle and the change speed gear for the rotary movement imparted to the spindle. In the drawings:

FIG. 3 is a cross-sectional vertical view of the headstock of the machine-tool in FIG. 1;

FIG. 6 is a schematic diagram of a circuit for controlling and operating mechanism of the invention.

Figure 1:
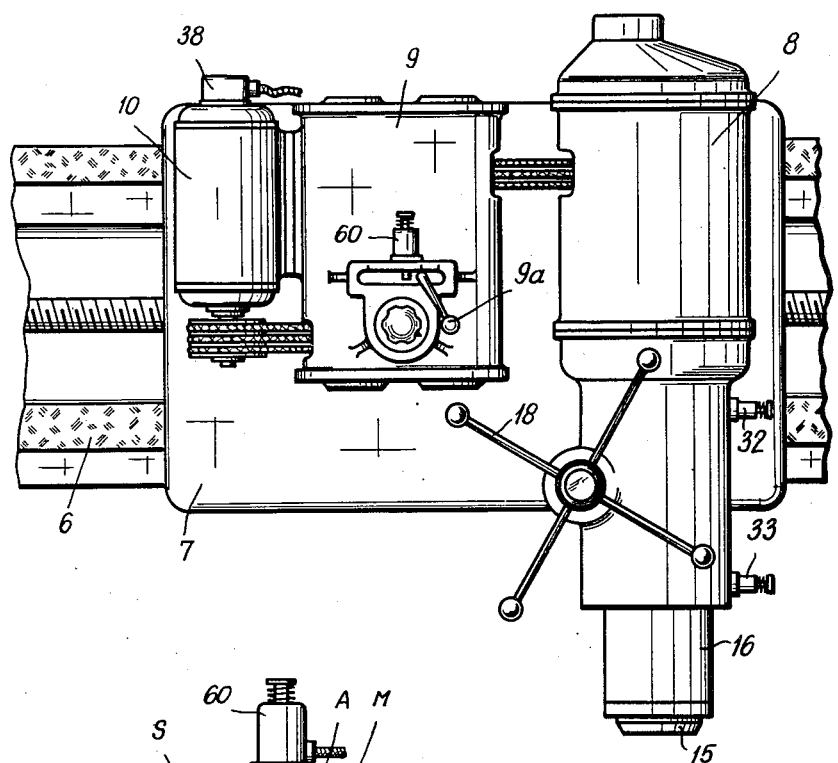
FIG. 1 is a fragmentary elevational view of a machine-tool to which the invention has been applied.

In FIG. 1, a boring machine provided with the invention is illustrated. The machine tool comprises horizontal ways 6, a traveling carriage 7 thereon provided with a headstock connected to a change speed gear 9 driven by an electric motor 10 which drives a spindle 15.

The headstock 8 includes as illustrated in FIG. 3 a casing 8a, a hollow pulley 11 rotatably mounted inside the casing on two ball bearings 12. A transmission belt 13 operatively connects the pulley 11 with the output shaft of the change speed gear 9.

The tool-carrying spindle 15 is arranged coaxially with the pulley 11 and extends partly inside the latter. It is carried inside a quill 16 and mounted on ball bearings 17 of which only one is illustrated. The quill can move axially and its axial movements are controlled by a hand-wheel 18 rigid with a pinion 19 meshing with a rack 20 fixed to the quill.

Over the upper end of the spindle 15 is fitted a tubular member 21 the lower end of which is rigid with an outer flange 21a. The upper section of the tubular member flares outwardly and forms the driven member of a clutch 23 the driving member of which is a sleeve 24. These coaxial members 23 and 24 are provided with interengaging teeth. The sleeve 24 is provided with outer longitudinal ribs 25 engaging longitudinal grooves 26 formed in the inner surface of the pulley 21. Consequently the sleeve 24 rotates in unison with the pulley 11, but it may slide axially with reference thereto.

A spring 27 wound around the tubular member 21 seats on the one hand on a flange 21a and on the other hand on an inner shoulder 24a formed at the lower end of the sleeve 24. This spring urges the spindle 15 and the quill 16 downwardly since the sleeve 24 is held against the inner flange 28a of a cylindrical member 28 rigid with the pulley 11.

The headstock is equipped with means for fastening the tool, including a tie rod 29 extending axially throughout the length of the spindle 15. The tie rod is adapted to urge towards each other, through an axial shifting two interengageable frusto-conical members which are not illustrated and are rigid respectively with the tool and with the spindle. The tie rod includes a threaded section which is not illustrated on the drawing and is adapted to be screwed inside a tapping formed in the frusto-conical section of the tool. The means for clamping the tool in position includes a worm wheel 30a meshing with a worm 30b adapted to make the tie rod 29 turn by the amount required for locking of the tool.

The parts adapted to couple the tie rod 29 with the worm wheel 30a comprise an extension of the hub of the worm wheel, which is provided with a square opening, for receiving an upper correspondingly square shaped end of the tie rod 29 when the tie rod is moved upwardly to clamp a tool in the head spindle.

The position illustrated as occupied by the quill 16 and the spindle 15 is an intermediate position between the position driving the spindle 15 i.e. its lowermost position and the tool clamping position, i.e. its uppermost position.

The rotation of the tie rod 29 is imparted by a motor which is not illustrated and the shaft of which is kinematically connected with the worm 30b. The starting of this motor is controlled automatically through electro-mechanical means including an actuating rod 34 extending coaxially through the worm wheel 30a for actuating a switch 35 controlled by this rod at the moment the rod 34 is urged upwardly by the upper end of the tie 29. A somewhat similar mechanism is disclosed in the application for a U.S. patent filed by the assignee in the United States of America under Serial No. 687,163.

The spindle 15 is held fast during the rotary movement of the tie rod 29 through the interengagement of the two coaxial series of teeth 36a and 36b cut respectively in the inner wall of the larger diameter section of the tubular member 21 and on the cylindrical projection of a transverse wall of the casing 8a, which carries a bearing for the worm wheel 30a.

The machine illustrated includes means for braking the motor 10 and the spindle 15. This means is operated through a current reversal. This reversal is obtained through an opening of the switch 45 (FIG. 6). The braking action is cut off before the motor 10 and spindle 15 stop rotating. The cutting off is done by a small generator in the form of an alternator 38 fitted over one end of the motor shaft 10a, and operating in a manner which will be disclosed hereinafter.

Figure 5:
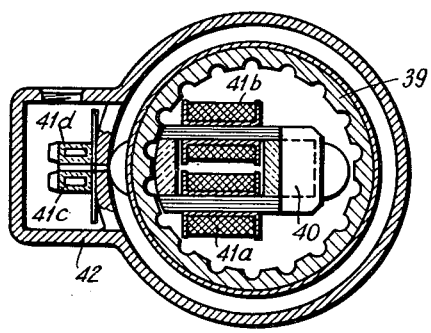
FIG. 5 is a cross-section through line V—V of FIG. 4.
Figure 4:
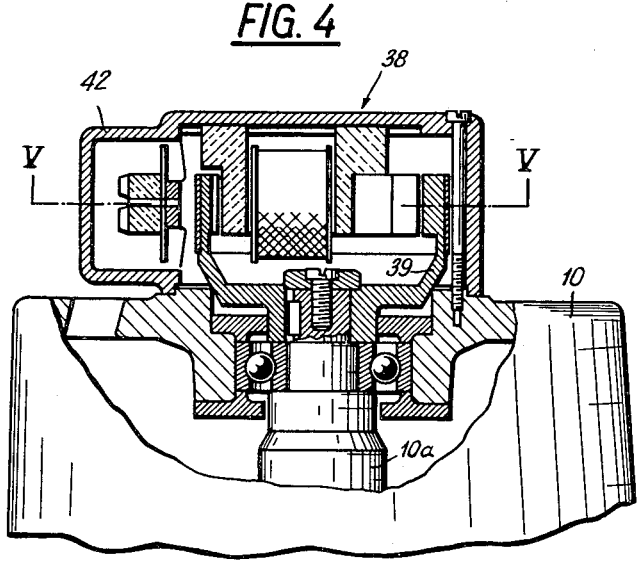
FIG. 4 is a fragmentary elevation view partly in section illustrative of the end of a motor driving a spindle, torn off to provide a cross-sectional view thereof.

The rotor of the generator or alternator is constructed in the shape of a drum 39 (FIG. 4) provided with inner flutings while the stator is a permanent magnet 40 (FIG. 5) having two arms which carry respectively the coils 41a and 41b. The poles of the magnet 40 are located close to the fluted surface of the rotor so that the rotation of the latter may modify periodically the reluctance of the magnetic circuit of the magnet 40 and consequently produce, through induction in the coils 41a, 41b, an alternating electromotive force which is rectified by a bridge rectifier 44 (FIG. 6).

The rotor and the stator of the alternator 38 are housed inside a casing 42 the bottom of which serves as a carrier for the stator.

The machine also comprises three safety systems. Two of them are adapted to prevent the fortuitous meshing between the teeth 36a and 36b, as a consequence of an undesired shifting of the spindle between its lowermost position and its uppermost position during the rotation of the spindle and to prevent fortuitous meshing between the teeth of the clutch members 23 and 24 as a consequence of a lowering of the spindle between its median position and its lower position while the pulley 11 is being rotated and the spindle is being held fast.

These two safety systems are constituted by corresponding electromagnetic lock bolts 32 and 33, having locking shanks which are adapted to fit inside the longitudinal grooves 16a and 16b of the quill respectively.

Figure 2:
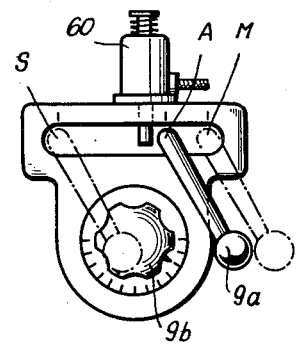
FIG. 2 is a view on a larger scale of a detail of the machine-tool of FIG. 1.

The third safety system is adapted to lock a control lever 9a of the change speed gear 9, of which a detailed description is given in assignee's copending U.S. patent application 625,950, now Patent No. 1,896,462, which may occupy three different positions as readily apparent from inspection of FIG. 2. These positions are a stopping position A, a normal running position M and a position S adapted to allow speed selection through the rotary knob 9b. The locking system for the lever 9a includes an electromagnetic bolt 60 which prevents the movement of the lever 9a from its position A into its position S so long as the motor 10 has not completely stopped.

These three safety systems are controlled by an electric circuit the diagram of which is illustrated in FIG. 6.

In the circuit diagram, 43 designates a supply of direct current, 32a, 33a and 60a the coils actuating the corresponding electromagnetic bolts or solenoids 32, 33 and 60, 46 a resistance, 47 a condenser and 50 to 55 the operating coils of polarized relays controlling the contacts illustrated respectively at 50a—50b—50c, 51a—51b—51c, 52a—52b, 54a—54b and 55b—55c.

The starting of the motor 10 and of the spindle 15 is obtained through the closing of the switch 45 which energizes the relay 55 which closes in its turn the contacts 55a, 55b and 55c together with the contact 55' starting the motor 10 in its operative direction. The contact 55a energizes the relay 54 which closes in its turn the contacts 54a and opens the contact 54b. As to the closing of contact 55b, it energizes the relay 50 which serves to set the braking means in a position of readiness so that they may become actually operative as soon as the motor is stopped upon reopening of the switch 45. The relay 50 closes the contacts 50a and 50b and opens the contact 50c. Since the contact 54a has already been closed, the closing of contact 50a energizes the holding relay 52 which closes in its turn the contact 52a to ensure the continuation of the energization of the relay 52, even if the relay 54 becomes inoperative upon opening of the switch 45. The relay 52 also closes the relay contact 52b to allow energization of the actual braking relay 53 upon subsequent reclosing of the contact 54b.

On the other hand, the closing of the above-mentioned contact 55c has energized the relay 51 which closes the contacts 51a, 51b and 51c over the corresponding electromagnets 32a, 33a and 60a so as to release the corresponding safety means.

When it is desired to stop the motor, the switch 45 is opened, so as to deenergize the relay 55, which opens the switch 55' feeding the motor. Consequently, also the contact 55a opens and the relay 54 is deenergized. This provides for the reclosing of the switch 54b and for the energization of the relay 53 through the closed contacts 50a, 52a, 52b, and 54b. The energization of the relay 53 provides for the braking of the motor by closing the switch 53' which applies to the motor a current the direction of which is opposed to that providing its normal running.

The motor will continue running through inertia, the alternator 38 also continues running while slowing down and it continues thus energizing the relays 50 and 51 since the relay contact 50b is still closed. This energization lasts as long as the alternator provides a sufficient voltage and when the speed of the motor and alternator drops underneath a predetermined value, the relay 50 is deenergized so that the contacts 50a and 50b open and the contact 50c closes. The condenser 47 which has been charged during operation then discharges through the contact 50c and continues energizing the relay 51 for a short time, after which the contacts 51a, 51b and 51c open. The electromagnets 32a, 33a and 60a are deenergized and the safety means are released. The braking reverse current has been broken in the meantime through deenergization of the relay 53 upon opening of the contact 50a, as soon as the relay 50 is deenergized.

Obviously, the control circuit for the braking means and the locking means may be replaced by purely mechanical control means or else by partly electric and partly mechanical means. Similarly, the condenser 47 may be replaced by some time-delay means such as a time-lag relay or a dash-pot which allows reaching the same result.

What I claim is:

1. In a machine-tool having a rotary tool-carrying spindle selectively operable longitudinally between an operative position and an inoperative position through an intermediate position, in combination, means comprising a motor for driving said rotary spindle in its operative position, a motor-energizing circuit connected to said motor having a motor-energizing switch connected therein, motor-braking means for automatically electrically braking said motor, means for holding the spindle against rotation when in its inoperative position, two electromagnetically actuated lock bolts for selectively locking the spindle longitudinally against movement away from its intermediate position respectively towards its inoperative position and towards its operative position, a control circuit having a main switch for starting and stopping said motor, a first relay in said control circuit for controlling said motor-energizing switch, a second relay controlled by said first relay, means controlled by said second relay for operating said two lock bolts to prevent movement of the spindle towards its inoperative position, a third relay connected for controlling energization of said electric motor-braking means, a current generator driven by the motor for applying energizing current to said second relay to maintain it energized in dependence upon said generator rotating at a speed sufficient to maintain said applied current at an intensity above a predetermined value, and a relay system controlled by said first relay, a combination of contacts controlled by said relay system to energize said third relay to initiate braking of said motor upon opening of said main switch and to maintain energization of said system operative during driving of said generator by said motor at a speed sufficient to generate said current applied to said second relay above said predetermined value.

2. In a machine-tool having a rotary tool-carrying spindle operable longitudinally between an operative position and an inoperative position through an intermediate position, in combination, a motor, a change speed gear driven by the motor for driving said rotary spindle in its operative position, a motor-energizing circuit having a motor-energizing switch, motor-braking means for electrically braking said motor, means for holding the spindle against rotation when in its inoperative position, two lock bolts for locking the spindle against longitudinal movement away from its intermediate position respectively towards its operative position and towards its inoperative position, a control circuit having a main switch connected for starting and stopping said motor, a third lock bolt for preventing change of gear ratios in said change speed gear, a control circuit having a main switch, a first relay in said circuit for controlling said motor-energizing switch, a second relay controlled by said first relay, means controlled by said second relay for operating said third bolt to allow operation of said change speed gear and for operating said two lock bolts to prevent movement of the spindle towards its inoperative position and allow movement towards its operative position, a third relay connected to energize said electric motor braking means, a current generator driven by the motor for applying current to said second relay to maintain it energized in dependence upon said generator rotating at a speed sufficient for the said current to remain above a predetermined value, a relay system controlled by the first relay, a combination of contacts controlled by said relay system to energize said third relay to brake the motor upon opening of said main switch and to maintain energization of said system operative during driving of said generator by said motor at a speed sufficient to generate said current above said predetermined value.

3. In a machine tool including a rotary tool carrying spindle selectively operable longitudinally between an operative position and an inoperative position through an intermediate position, in combination, a motor driving said rotary spindle in its operative position, a motor energizing circuit having a motor energizing switch, motor-braking means for automatically electrically braking said motor, means for holding the spindle against rotation when in its inoperative position, two bolts for locking the spindle longitudinally against movement away from its intermediate position respectively towards its operative position and towards its inoperative position, a control circuit having a main switch, a first relay in said control circuit for controlling the motor energizing switch, a second relay controlled by the first relay, means controlled by said second relay for operating the two locking bolts to prevent movement of the spindle towards its inoperative position, a third relay connected to energize the electric motor braking means, a current generator driven by the motor for applying current to said second relay to maintain said second relay energized in dependence upon said generator rotating at a speed sufficient for said current to have an intensity above a predetermined value, a relay system controlled by the first relay, a combination of contacts controlled by said relay system to energize said third relay to brake the motor upon opening of said main switch and to maintain energization of said relay system operative as long as said generator rotates at a speed sufficient to generate a current above said predetermined value and delaying means energized by said current from said generator to maintain for a short time the energization of the second relay when said current is no longer directly operative on said second relay.

4. In a machine tool including a rotary tool carrying spindle selectively operable betwen an operative and an inoperative position through an intermediate position, in combination, a motor, a change speed gear driven from said motor, a clutch to operatively connect the change speed gear with said rotary spindle for changing the operative longitudinal position of said spindle, means for holding the spindle against rotation in its inoperative longitudinal position, a circuit to energize the motor comprising a reversing switch in said circuit to control current flow alternatively for forward operation of said motor and for reversing and braking said motor, a control circuit, a main switch in said control circuit, a first relay in said control circuit connected to be energized upon closing of said main switch to cause said reversing switch to apply current to the motor for forward operation thereof and connected to be deenergized upon opening of said main switch, two safety lock bolts for locking the spindle in its intermediate position against movement in either direction, a third safety lock bolt to prevent change of gear ratios in said change speed gear, a current generator driven by the motor, a second relay under control of the first relay energized by said generator for operating said three safety bolts upon energization of said first relay to prevent movement of the spindle towards its inoperative position and to allow a change of gear ratios in the change speed gear in dependence upon the intensity of said generator current remaining above a predetermined value after deenergization of the first relay upon opening of the main switch, a third relay to operate the reversing switch to a motor braking position, and a relay system controlled by the first relay and current from the generator to cause said generator current to energize the third relay upon opening of the main switch and deenergization of said first relay in dependence upon the intensity of said current energizing said first relay remaining above a predetermined value.

5. In a machine tool having a rotary tool carrying spindle selectively operable longitudinally between an operative position and an inoperative position through an intermediate position, in combination, a motor for driving said rotary spindle in its operative position, a motor energizing circuit having a motor energizing switch, means for holding said spindle against rotation when in its inoperative position, two electromagnetically actuated lock bolts for locking the spindle longitudinally against movement away from its intermediate position respectively towards its operative position and towards its inoperative position, a control circuit having a main switch for starting and stopping said motor, a first relay in said control circuit for controlling said motor energizing switch, a second relay controlled by said first relay, means controlled by said second relay for operating said two locking bolts to prevent movement of the spindle towards its inoperative position, a current generator driven by the motor connected to apply energizing current to said second relay and to maintain it energized in dependence upon the generator rotating at a speed sufficient for the intensity of current applied to said second relay remains above a predetermined value, and time lag means operative to energize said second relay between the time in which the current applied by generator to said second relay drops below said predetermined value and immediately following stopping of said rotary spindle, and means for opposing the action of the second relay for normally holding said two bolts in positions preventing movement of the spindle towards its operative position.

6. In a machine tool having a rotary tool carrying spindle selectively operable longitudinally between an operative position and an inoperative position through an intermediate position, in combination, a motor driving said rotary spindle in its operative position, a motor energizing circuit having a motor energizing switch, means for holding the spindle against rotation when in its inoperative position, two automatically selectively operated lock bolts for locking said spindle against longitudinal movement away from its intermediate position respectively towards its operative position and towards its inoperative position and for selectively releasing said spindle, a control circuit having a main switch inserted in the control circuit, a first relay in said control circuit for controlling said motor energizing switch, a second relay controlled by said first relay, means controlled by said second relay for operating said two lock bolts to prevent movement of the spindle towards its inoperative position, an A.C. generator including a rotor driven by the motor comprising an inwardly fluted drum, a stationary magnet disposed internally of the drum and a winding surrounding the magnet, rectifying means for rectifying the output of the A.C. generator and connected to direct current to said second relay to maintain it energized in dependence upon the generator rotating at a speed sufficient for the intensity of said current to remain above a predetermined value, and time lag means to energize the second relay during an interval between the time the current generator current drops below said predetermined value and immediately following the stopping of the rotary spindle.

7. In a machine tool having a rotary tool carrying spindle selectively operable longitudinally between an operative position and an inoperative position through an intermediate position, in combination, a motor for driving said rotary spindle in its operative position, a motor energizing circuit having a motor energizing switch, means for holding the spindle against rotation in its inoperative position, two lock bolts for locking said spindle longitudinally against movement away from its intermediate position respectively towards its operative position and towards its inoperative position, a control circuit having a main switch, a first relay in said control circuit for controlling said motor energizing switch, a second relay controlled by the first relay, means controlled by said second relay for operating said two lock bolts to prevent movement of the spindle towards its inoperative position, an A.C. generator having a rotor driven by said motor, comprising inwardly fluted drum, a stationary magnet internally of the drum and a winding developed on the magnet, rectifying means connected for rectifying the output of said A.C. generator and to apply direct current to said second relay to maintain it energized in dependence upon said generator rotating at a speed sufficient for said current to remain above a predetermined value, a condenser charged by said rectifying means connected in parallel with said second relay, and means responsive to deenergization of said first and second relays for electrically connecting said condenser with said second relay to energize said second relay for an interval after the speed of said motor and generator drops and said current drops beneath said predetermined value and until said motor and generator have actually stopped.

References Cited in the file of this patent

UNITED STATES PATENTS

| | | |
|---|---|---|
| 816,869 | Magnuson | Apr. 3, 1906 |
| 1,640,549 | Lamme | Aug. 30, 1927 |
| 2,191,137 | Trible | Feb. 20, 1940 |
| 2,557,582 | Turrettini | June 19, 1951 |
| 2,628,413 | Hallenbeck | Feb. 17, 1953 |
| 2,667,819 | De Vlieg | Feb. 2, 1954 |
| 2,924,152 | Zettler | Feb. 9, 1960 |

FOREIGN PATENTS

| | | |
|---|---|---|
| 253,898 | Germany | Nov. 18, 1912 |